July 22, 1958
W. R. KING
2,844,443
METHOD AND APPARATUS FOR OIL PREHEAT
FOR CARBON BLACK FURNACE
Filed March 20, 1957
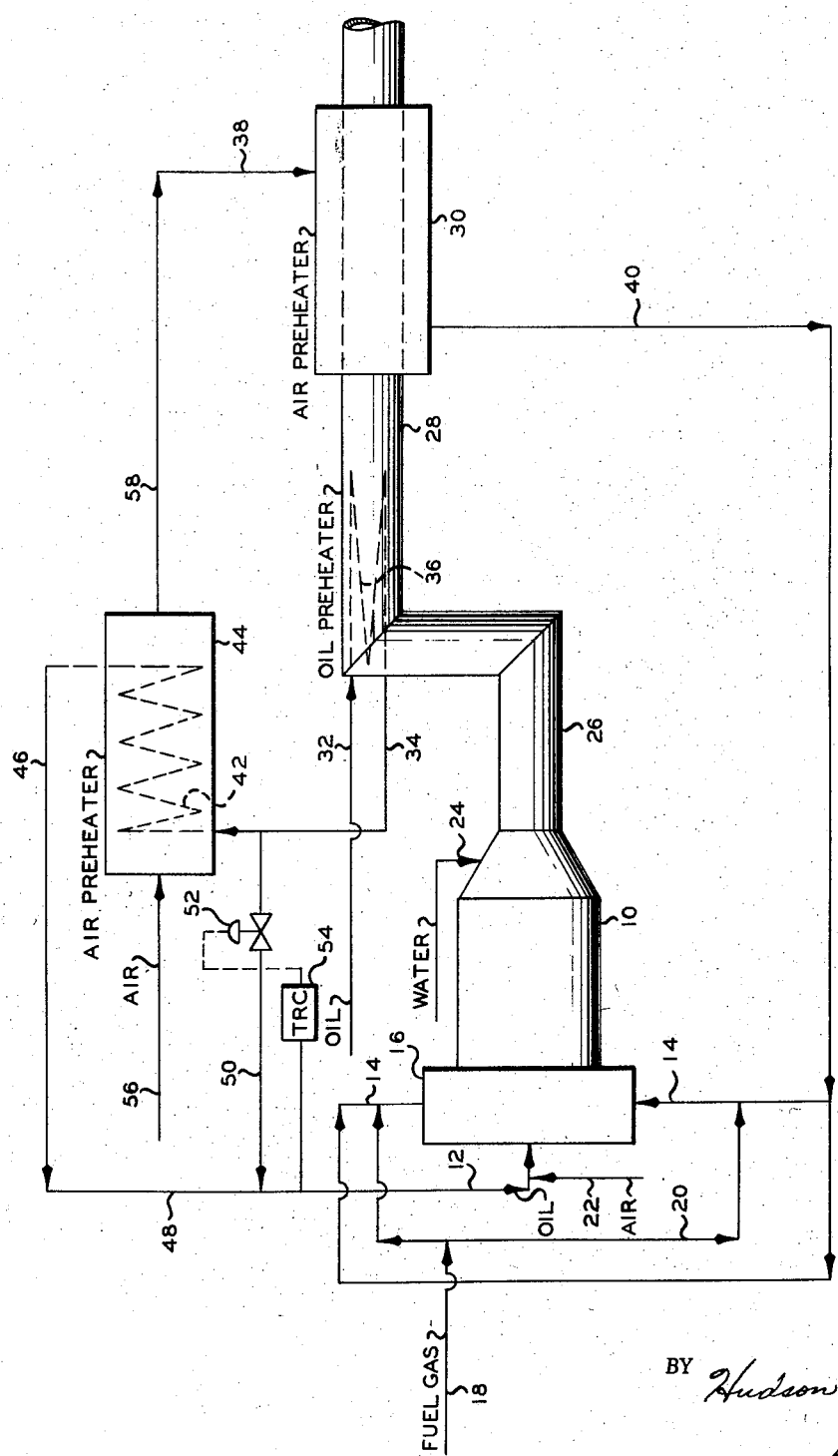
INVENTOR.
W. R. KING
BY *Hudson & Young*
ATTORNEYS

United States Patent Office 2,844,443
Patented July 22, 1958

2,844,443

METHOD AND APPARATUS FOR OIL PREHEAT FOR CARBON BLACK FURNACE

William R. King, Bartlesville, Okla., assignor to Phillips Petroleum Company, a corporation of Delaware Application March 20, 1957, Serial No. 647,409

10 Claims. (Cl. 23—209.6)

This invention relates to carbon black production and to an improved method and apparatus for preheating the oil feed to a carbon black furnace.

In the production of carbon black by incomplete combustion of an oil feed stock in a carbon black furnace or reactor it has been found that preheating of the oil to an elevated temperature below incipient cracking prior to injection of the oil into the furnace decreases the amount of oil burned in the reactor to supply the heat for the production of the carbon black and increases the yield of carbon black. It is also recognized that preheating of the oil to a constant preheat temperature effects the production of carbon black of more uniform quality. One method utilized in the oil preheat step in a carbon black process comprises passing the oil feed in indirect heat exchange with the effluent from the carbon black furnace; however, this method does not effect a suitably constant temperature in the preheated oil stream because of the variations in the coating thickness during operation of the process. Of course, it must be recognized that any carbon black coating or variation in thickness in the carbon black coating on the walls of the heat exchange tubes alters the heat transfer coefficient thru the wall.

Another method of preheating the oil feed comprises heating the oil in indirect heat exchange with the effluent from the carbon black furnace with bypassing of a variable portion of the oil feed stream around the heat exchanger in order to compensate for changed rates of heat transfer thru the heat transfer tubes. This method of operation produces a constant preheated oil temperature but, under conditions requiring a small proportion of oil flow thru the heat exchanger where bypass flow is increased to compensate for high heat transfer in the heat exchange tubes, coking in the heat exchange tubes results and this interferes with flow of oil and, of course, with the efficiency of heat exchange thru the tubes.

Accordingly, it is an object of the invention to provide an improved process and arrangement of apparatus for making carbon black of uniform quality. Another object is to provide an improved method and apparatus for preheating an oil fed to a carbon black furnace. A further object is to provide an improved process and arrangement of apparatus for preheating an oil fed to a carbon black process which avoids coking of heat exchange tubes in which the preheat is effected. Other objects of the invention will become apparent by consideration of the accompanying disclosure.

In accordance with the invention an oil feed to a carbon black furnace is preheated to a constant elevated temperature, prior to injection into the carbon black furnace, in an indirect heat exchanger positioned in the effluent stream from a carbon black furnace and coking of the oil feed on the walls of the heat exchange tubes is substantially avoided. The method comprises passing all of the oil feed thru the exchanger at a rate and under conditions which preheat the oil feed to a temperature below the incipient cracking temperature of the feed but sufficiently high to effect substantial improvement in carbon black yield over operation with feed at normal temperatures. The preheat temperature obtained in this transfer must be higher than the desired preheat temperature and the resulting stream is then divided, a portion being passed thru a second heat exchanger in indirect heat exchange with a suitable fluid whereby the temperature of this stream is reduced and then mixed with the remaining portion of the preheated stream and the proportions of oil in the two streams are controlled and regulated so as to provide a mixed stream for injection into the furnace at the desired predetermined preheat temperature.

In accordance with another embodiment of the invention, air for the combustion process in the carbon black furnace is passed thru the fluid heat exchanger in indirect heat exchange with one portion of the preheated oil stream so as to reduce the temperature of this portion of the stream below the desired predetermined preheat temperature and also to heat the air for combustion in the furnace. The preheated air can be injected directly into the furnace but it is preferable to pass the air feed thru a second indirect heat exchanger positioned in the gaseous effluent line from the carbon black furnace downstream of the oil preheater so as to further heat the air and provide a higher air preheat temperature for the purpose of reducing the heat requirements from combustion of oil in the furnace.

A more complete comprehension of the invention may be obtained from consideration of the schematic drawing which is a plan of a preferred arrangement of apparatus in accordance with one embodiment of the invention.

An O type reactor or carbon furnace 10 is provided with an axial oil inlet 12 and a pair of tangential air inlets 14 leading into the enlarged inlet end 16 of the furnace. A fuel gas line 18 connects with distribution line 20 which feeds fuel gas into air inlet lines 14. Auxiliary air line 22 provides tangential air introduction into the oil injection line 12.

Water quench line 24 introduces quench water into the effluent end of the furnace as the gaseous effluent leaves the furnace. Gaseous effluent line 26 carries hot quenched effluent from the furnace thru oil preheater 28 and thru air preheater 30, successively. Oil feed line 32 and oil effluent line 34 connect with heating coil 36 of the oil preheater. Air preheater 30 is provided with air inlet line 38 and air effluent line 40 which connects with air injection lines 14 on furnace 10. Oil effluent line 34 is connected with heat exchanger coil or tubes 42 in air preheater 44 and the effluent oil line 46 from preheater 44 connects with line 48 which in turn connects with oil injection line 12 on furnace 10.

Bypass oil line 50 connects oil line 34 with line 48. Bypass line 50 is provided with a variable flow control valve, such as a motor valve 52, and this valve is controlled by temperature recorder controller 54 which is sensitive to the temperature of the oil in line 48 downstream of its junction with line 50. Air inlet line 56 connects with air preheater 44 and the air effluent line 58 therefrom connects with inlet line 38 to air preheater 30.

The carbon black process as conducted in furnace 10 is conventional and well known in the art so that details of this operation will not be specifically set forth since the invention lies in the arrangement of apparatus for and method of preheating the oil feed to the process to obtain a substantially constant predetermined oil preheat temperature and in the arrangement of apparatus for and method of preheating the air for the carbon black process.

In order to illustrate the invention, operating conditions and method for a specific process comprise feeding an oil (which is a recycle oil from a hydrocarbon cracking process having a high aromatic content and sulfur dioxide extracted) at the rate of 215 gallons per hour at atmospheric temperature thru line 32 into preheater 28. The effluent from reactor 10 is water quenched at the rate of 15 gallons per minute in line 24 so as to reduce the temperature of the gaseous effluent to about 1200° F. This effects a preheat temperature in line 34 of about 775° F. The preheated oil stream is divided so that a portion passes thru heat exchanger 44 and another portion passes thru line 50. Air introduced thru line 56 at about 130° F. (due to compression thereof) at the rate of 140,000 standard cubic feet per hour (s. c. f. h.) is passed thru preheater 44 wherein the temperature is raised to about 150° F. The oil at less than a predetermined preheat temperature of 750° F. passes thru line 46 into line 48 where it is mixed with the bypass oil in line 50 under the control of valve 52 controlled by instrument 54 which is set to maintain a temperature of 750° F. in line 48 downstream of line 50. Air at 150° F. passing thru line 38 and heat exchanger 30 is heated to about 550° F. by the gaseous effluent in effluent line 26 which is at a temperature of about 950° F. as it enters the air preheater. This preheated air is introduced to the furnace thru air inlets 14 admixed with natural gas admitted thru line 18 at the rate of 9,300 s. c. f. h. Air at the rate of 4,000 s. c. f. h. and at a temperature of 130° F. is injected tangentially thru line 22 into oil injection line 12. Carbon black in the effluent from air heater 30 is at a temperature of 700° F. and is subjected to conventional recovery by cooling and recovery means which constitute no part of the invention.

In normal operation, the temperature of the gaseous effluent from the furnace will vary after quenching in the range of about 1100° F. to 1300° F. and the effluent will be cooled in passing thru the oil preheater to a temperature in the range of 900 to 1000° F. and further cooled in air preheater 30 to the range of 600° to 800° F. It is possible at these varying conditions to maintain the desired preheat temperature of 750° F. substantially constant even though the high preheat temperature of the oil in line 34 varies in the range of 755 to 800° F. by the flexibility in the proportioning of oil flowing thru bypass line 50 and that flowing thru air preheater 44. Temperature controller 54 is set to maintain a constant temperature in the mixed stream in line 48. The effluent air from air preheater 44 will vary in temperature in the range of about 130 to 170° F. due to fluctuations in the quantity of oil passed thru this preheater.

It is to be understood that the process and apparatus disclosed herein are effective in maintaining any constant predetermined preheat temperature in the range of about 400° F. to the incipient cracking temperature of the oil feed which allows a sage upper limit of about 800° F. The preheat temperature to be used in the process will determine the construction or capacity of oil preheater 28, but with a given heat exchange capacity in this heat exchanger operation over a fairly wide range of preheat temperature is possible because of the flexibility of the flow control arrangement on the split preheated oil lines.

The oil and air preheating method and arrangement of apparatus is also applicable to other types of carbon black furnaces than the O type illustrated in the drawing.

Certain modifications of the invention will become apparent to those skilled in the art and the illustrative details disclosed are not to be construed as imposing unnecessary limitations on the invention.

I claim:

1. In a process for producing carbon black by partial combustion of an oil feed with free-oxygen-containing gas in a combustion zone wherein the oil feed is preheated before introduction to said zone, the improvement comprising passing said feed in indirect heat exchange with the gaseous effluent from said combustion zone to preheat same to a temperature above the desired preheat temperature but below incipient cracking temperature; passing a first portion of the resulting preheated feed in indirect heat exchange with a heat exchange fluid so as to reduce its preheat temperature; mixing the resulting first portion at lower temperature with a second portion of said preheated feed at higher temperature; proportioning said first and second portions of preheated feed so as to obtain the desired preheat temperature; and passing the resulting preheated feed to said combustion zone.

2. The process of claim 1 wherein said feed is preheated to a temperature below incipient cracking temperature and at least 5° F. above said desired preheat temperature.

3. The process of claim 1 wherein said heat exchange fluid comprises said free-oxygen-containing gas.

4. The process of claim 1 wherein the temperature of the oil feed is in the range of 0 to 100° F. before preheat; the temperature of said gaseous effluent is reduced to the range of 1100 to 1300° F. by water quenching; the upper preheat temperature is in the range of 455 to 800° F.; and the desired preheat temperature is within last said temperature range.

5. The process of claim 1 wherein the oil feed is preheated to a temperature in the range of 755 to 800° F. and said first and second portions are adjusted to effect a desired preheat temperature of about 750° F.

6. The process of claim 1 wherein said heat exchange fluid comprises air and the resulting preheated air is heated further in indirect heat exchange with said gaseous effluent downstream of the heat exchange between said oil and said gaseous effluent and is then passed to said combustion zone to effect said combustion.

7. Apparatus comprising in combination a carbon black furnace having an oil injection line, an air injection line, and a gaseous effluent line; an indirect heat exchanger in said effluent line; an inlet oil line and a first effluent oil line connected with said exchanger; a fluid indirect heat exchanger connected in said oil effluent line having means for passing fluid therethru in indirect heat exchange with oil; a second oil effluent line from said fluid heat exchanger connected with said oil injection line; an oil by-pass line from said first effluent oil line to said second effluent oil line; and means for regulating the flow of oil thru said by-pass line.

8. The apparatus of claim 7 wherein last said means comprises a flow control valve in said by-pass line and a temperature-recorder-controller sensitive to the temperature in said oil injection line and in control of said flow control valve.

9. The apparatus of claim 7 including an air preheater in said gaseous effluent line connected by conduit with said fluid indirect heat exchanger and by conduit with said air injection line for preheating air for said furnace; a water quench line leading into the effluent end of said furnace.

10. The apparatus of claim 8 wherein said oil injection line is axial to said furnace, said air injection line is tangential to said furnace and including means for injecting fuel gas with tangential air.

References Cited in the file of this patent

UNITED STATES PATENTS

| 2,668,791 | Holland | Feb. 9, 1954 |
| 2,750,434 | Krejci | June 12, 1956 |
| 2,781,246 | Goldtrap | Feb. 12, 1957 |